O. EICK.
BOTTLE WASHING APPARATUS.
APPLICATION FILED APR. 10, 1905.

956,056.

Patented Apr. 26, 1910.
8 SHEETS—SHEET 1.

O. EICK.
BOTTLE WASHING APPARATUS.
APPLICATION FILED APR. 10, 1905.

956,056.

Patented Apr. 26, 1910.
8 SHEETS—SHEET 3.

Witnesses

Inventor:
Otto Eick,
By Dodge and Sons Attorneys

O. EICK.
BOTTLE WASHING APPARATUS.
APPLICATION FILED APR. 10, 1905.

956,056.

Patented Apr. 26, 1910.
8 SHEETS—SHEET 4.

O. EICK.
BOTTLE WASHING APPARATUS.
APPLICATION FILED APR. 10, 1905.

956,056.

Patented Apr. 26, 1910.

8 SHEETS—SHEET 5.

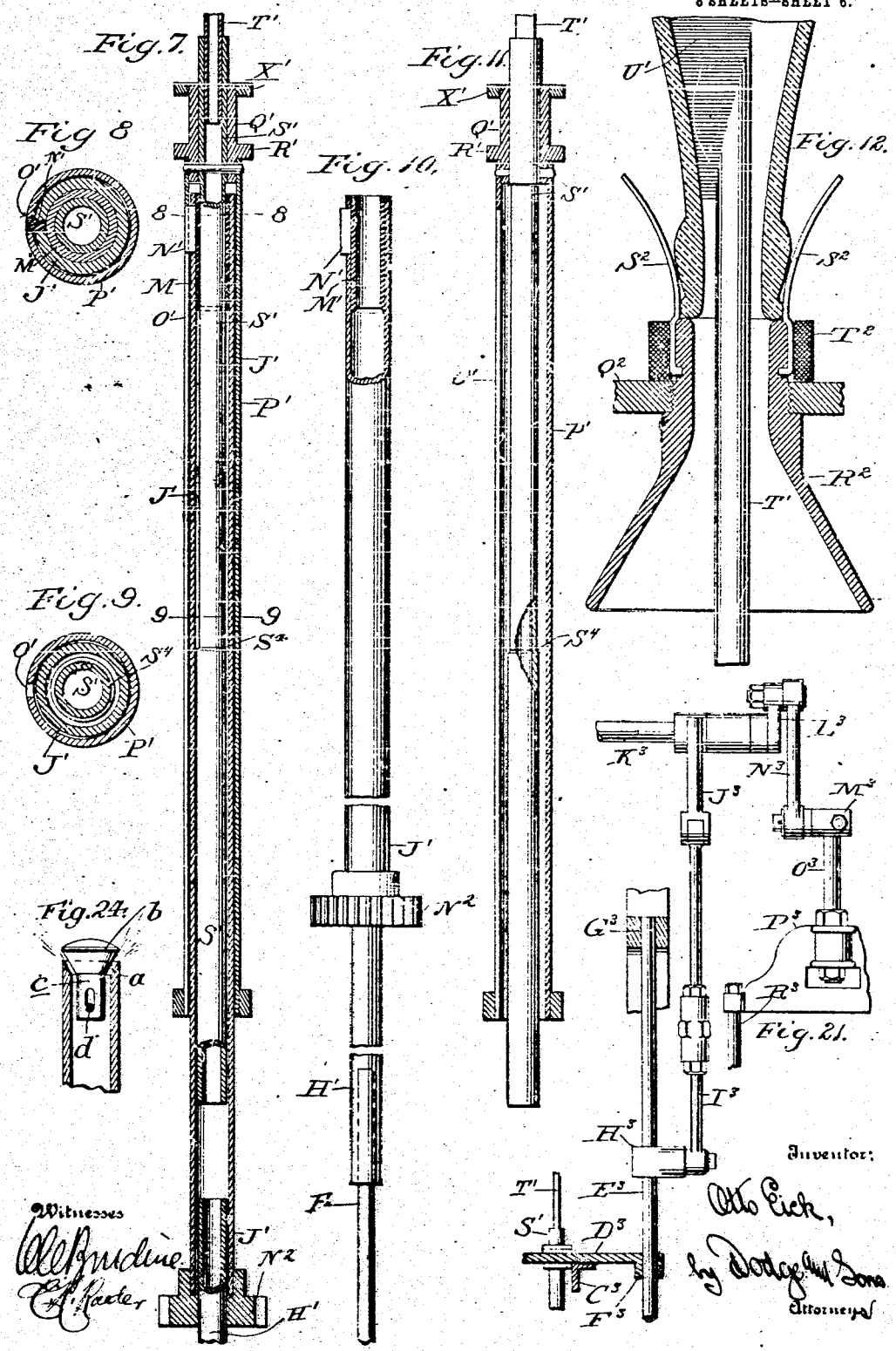

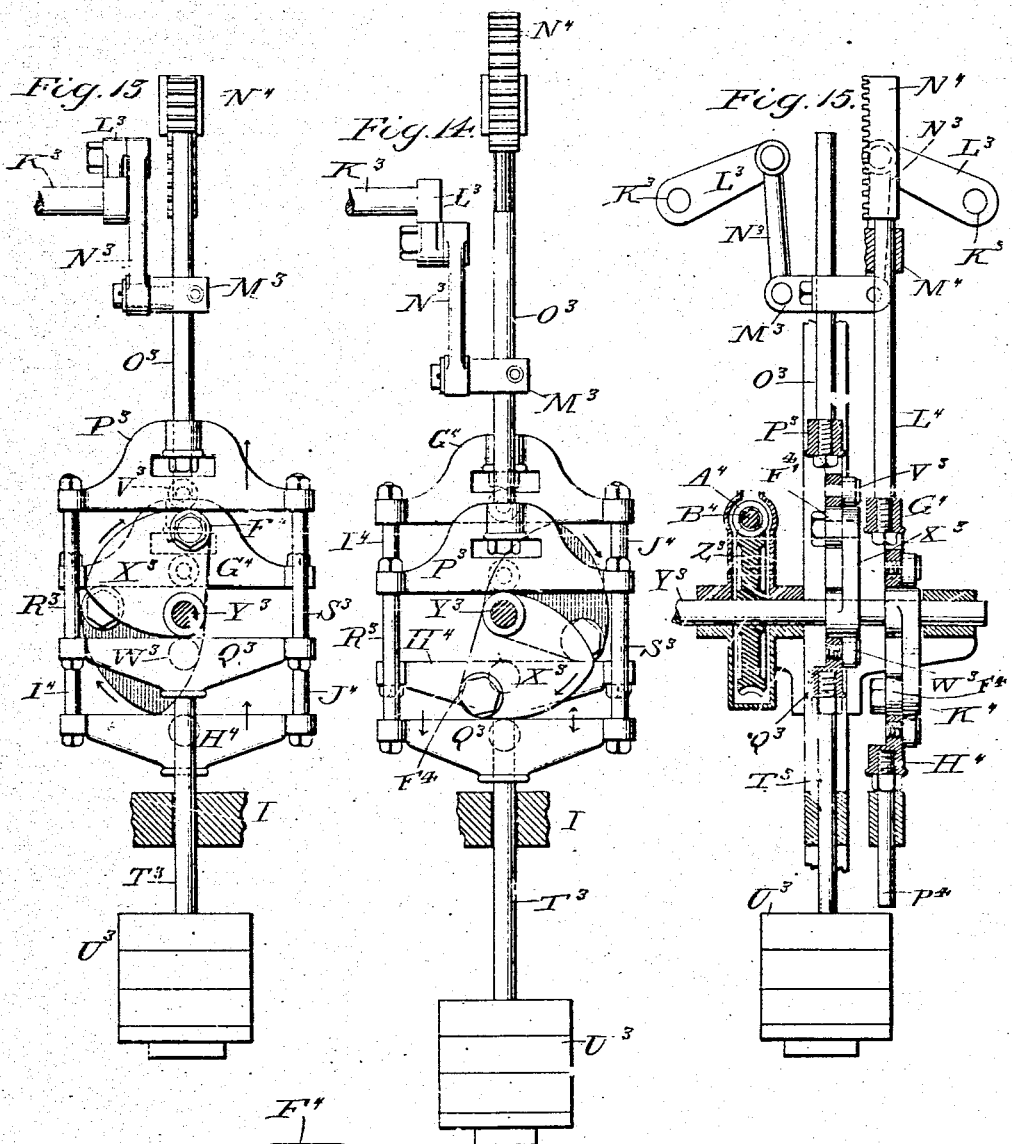

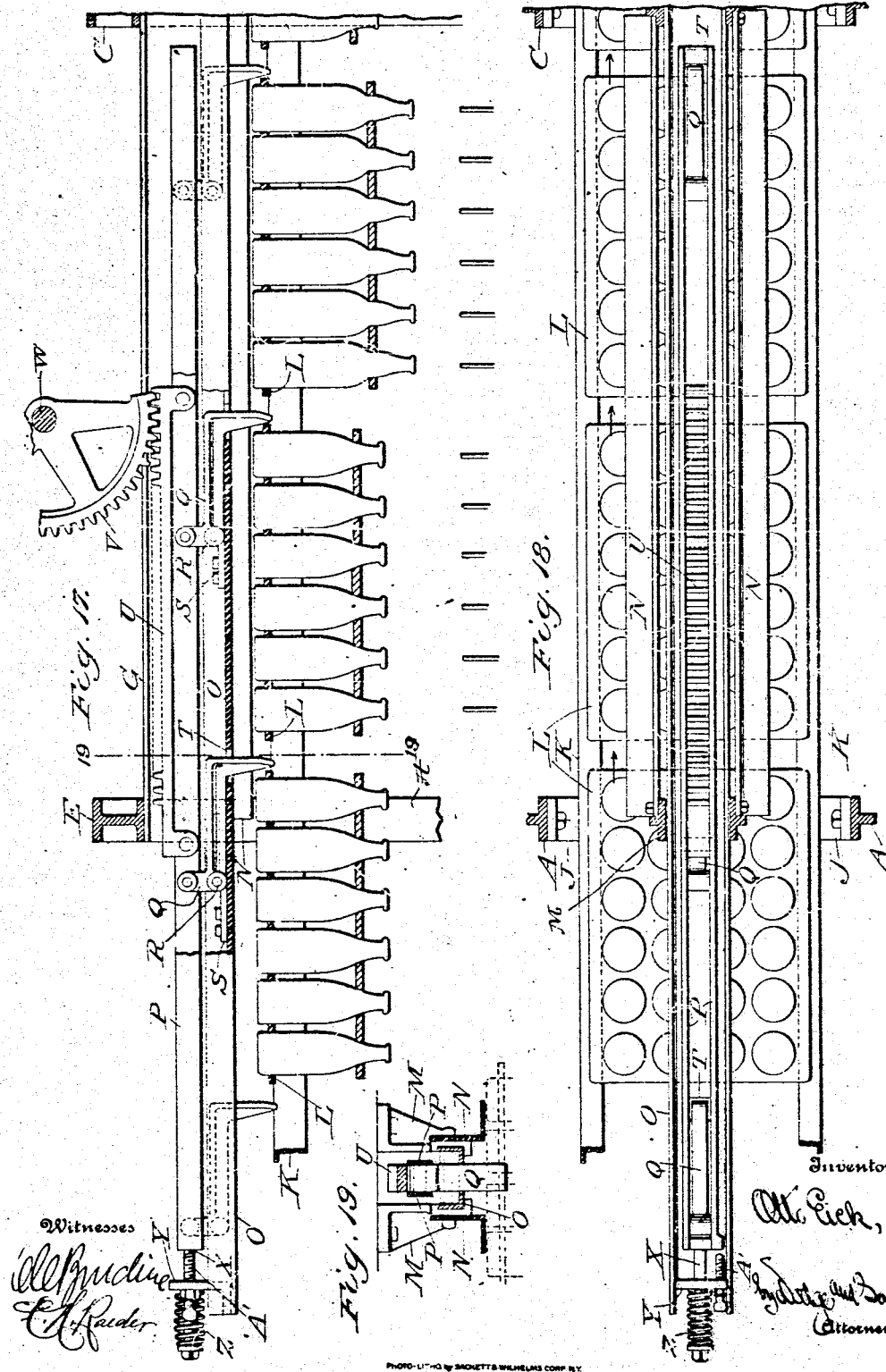

UNITED STATES PATENT OFFICE.

OTTO EICK, OF BALTIMORE, MARYLAND.

BOTTLE-WASHING APPARATUS.

956,056.

Specification of Letters Patent. Patented Apr. 26, 1910.

Application filed April 10, 1905. Serial No. 254,881.

*To all whom it may concern:*

Be it known that I, OTTO EICK, a citizen of the United States, residing at Baltimore, in the State of Maryland, have invented certain new and useful Improvements in Bottle-Washing Apparatus, of which the following is a specification.

Figure 1:
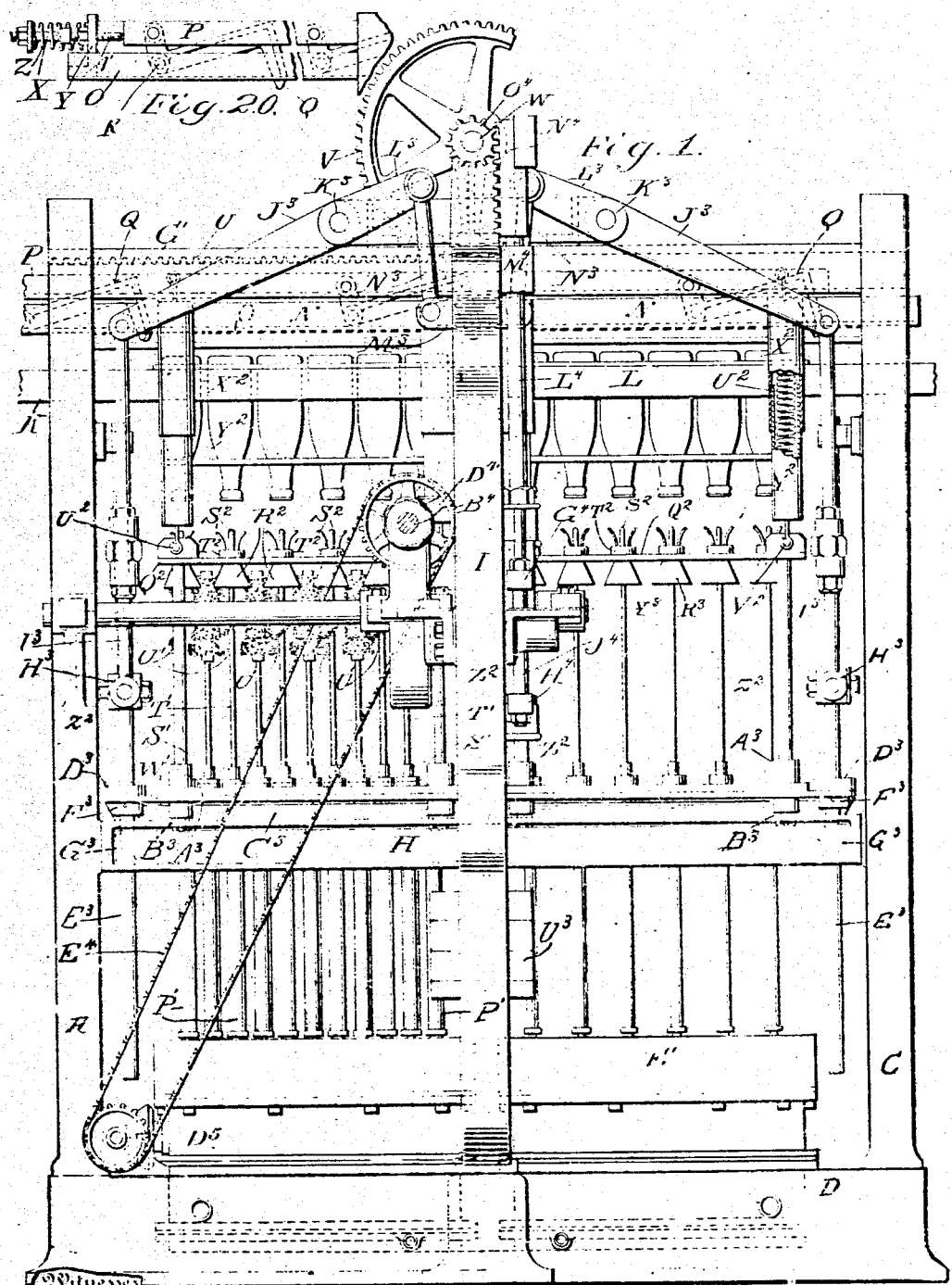
Figure 2:
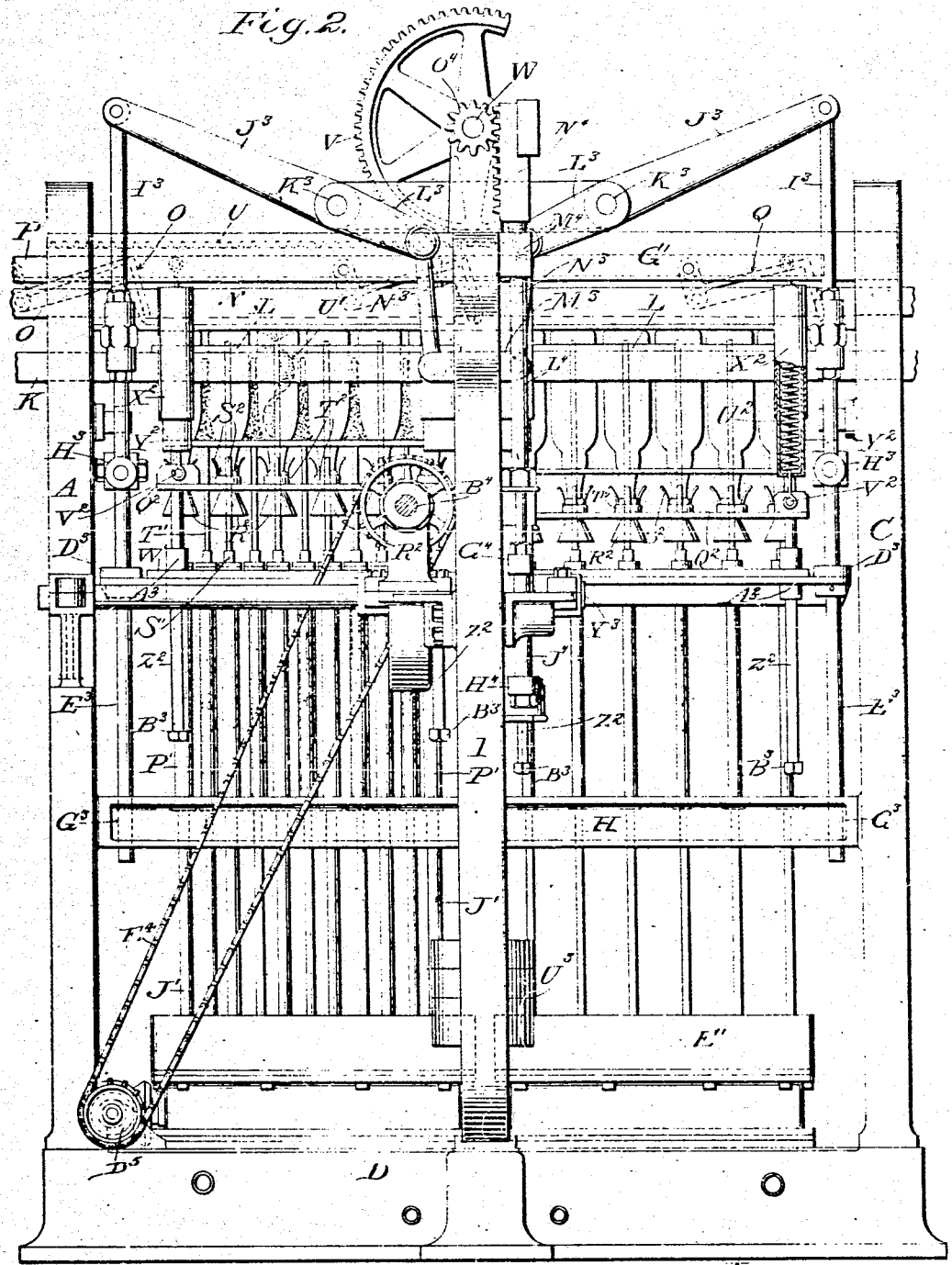
Figure 3:
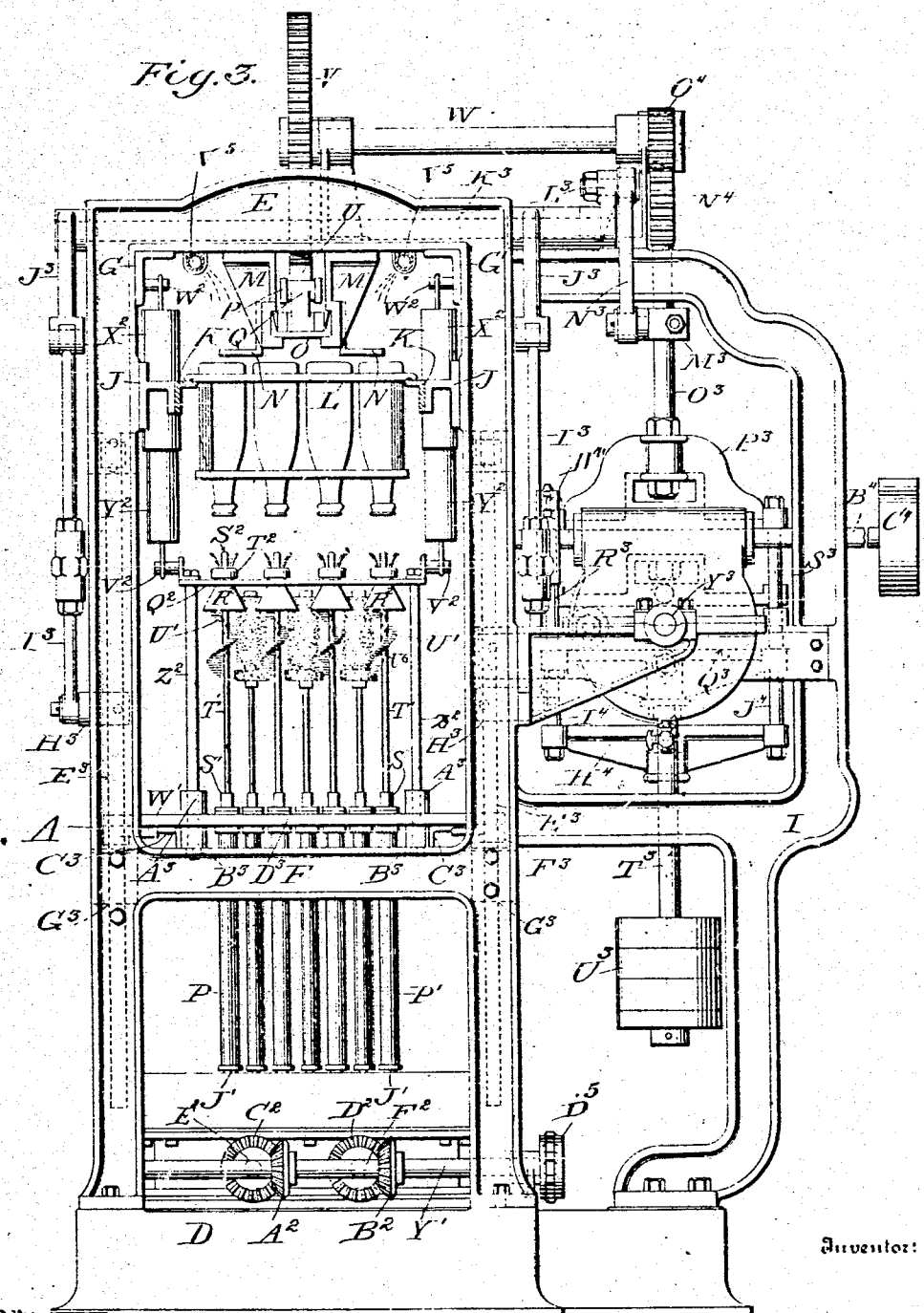
Figure 4:
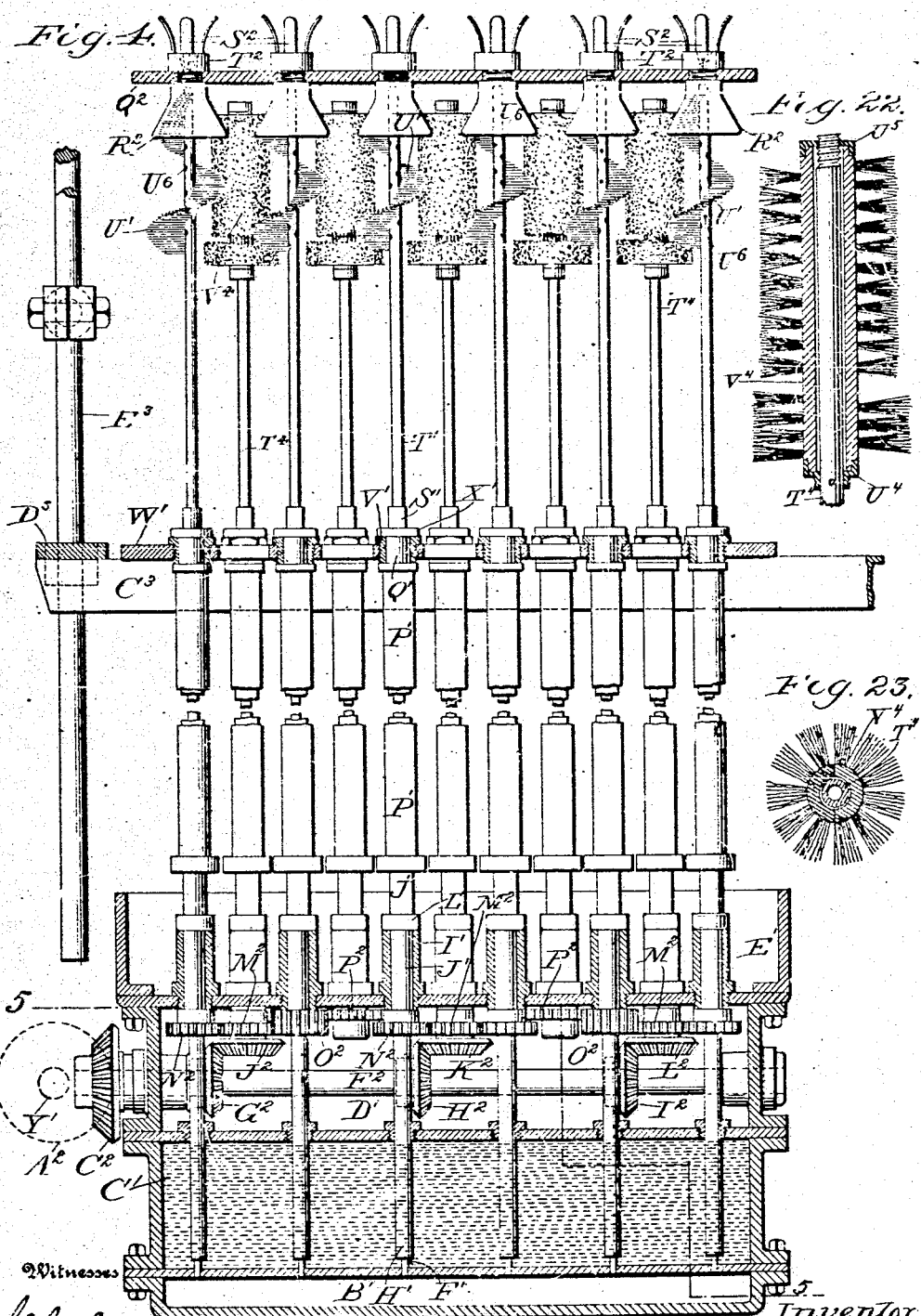
Figure 5:
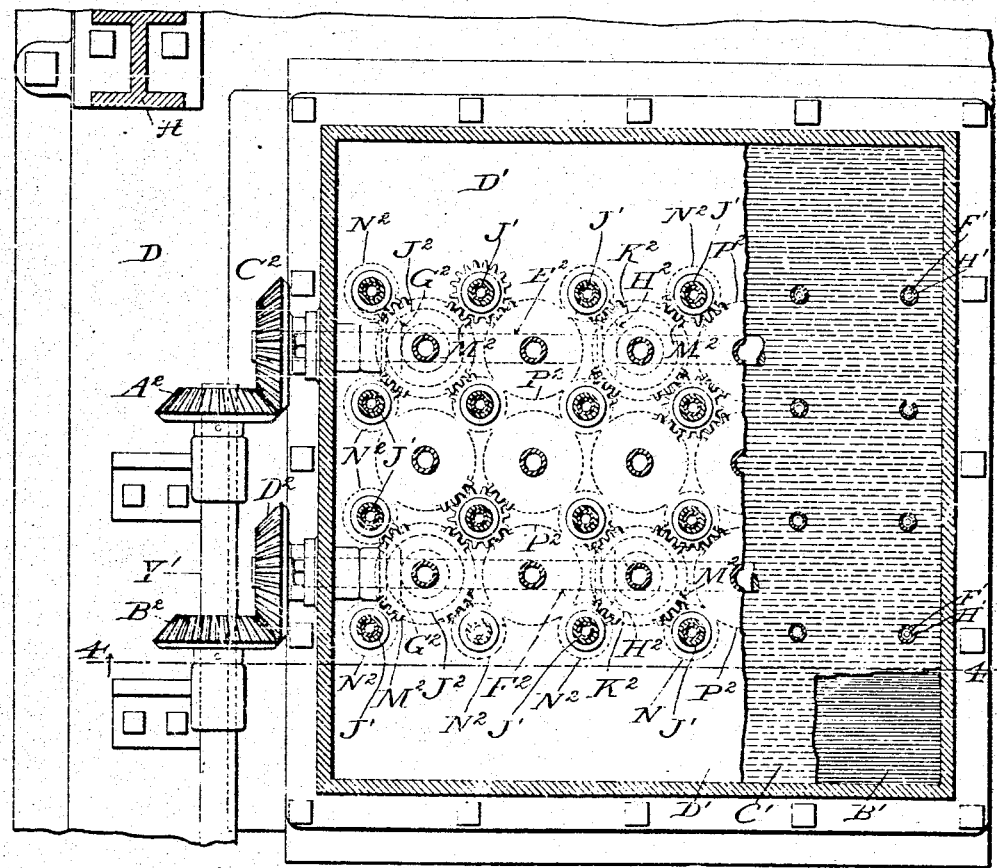
Figure 6:
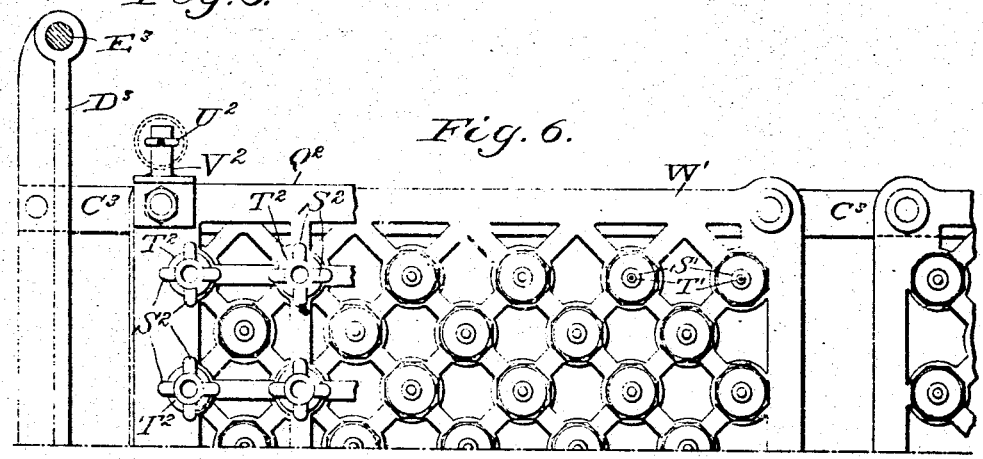

My present invention pertains to improvements in bottle-washing apparatus, the construction and advantages of which will be hereinafter set forth, reference being had to the annexed drawings, wherein:

Figure 1 is a side elevation of the apparatus; Fig. 2 a similar view, the parts being shown in a different position, or with the mouth-pieces raised and the spindles elevated; Fig. 3 an end view, the parts being shown in the same position as indicated in Fig. 1; Fig. 4 an enlarged vertical sectional view, taken on the line 4—4 of Fig. 5; Fig. 5 a transverse sectional view, taken on the line 5—5 of Fig. 4, the parts being broken away to more clearly show the apparatus; Fig. 6 a top plan view of a portion of the mouth-piece carrying plate and the spindle-carrying plate, the former being broken away to more clearly show the latter; Fig. 7 a vertical sectional view of one of the spindles used in the initial operation upon the bottle; Fig. 8 a transverse sectional view, on the line 8—8 of Fig. 7; Fig. 9 a similar view, on the line 9—9 of Fig. 7; Fig. 10 a side elevation, partly in section, of one of the spindle members; Fig. 11 a similar view of the other spindle portions; Fig. 12 a vertical sectional view, showing the mouth-pieces and one of the spindles; Fig. 13 a side elevation of the cams and the coacting parts employed to actuate the spindle-elevating frames and the bottle-rack advancing mechanism, the parts being shown in such position that the spindles are in their lowermost positions and the rack-advancing mechanism is just coming into operation; Fig. 14 a similar view, showing the parts in the positions they occupy when the spindles are elevated to their full extent and the rack-actuating mechanism is returning to its initial or forward position; Fig. 15 a vertical sectional view of the parts, the positions thereof being the same as shown in Fig. 13; Fig. 16 a perspective view of one of the lifting cams; Fig. 17 a side elevation, partly in section, of the bottle-rack advancing mechanism; Fig. 18 a top plan view thereof; Fig. 19 a transverse vertical sectional view, taken on the line 19—19 of Fig. 17; Fig. 20 a side elevation of a portion of the bottle-rack advancing mechanism, the parts being shown in a slightly different position from that illustrated in Figs. 17 and 18, or in such position that the mechanism may be drawn rearwardly to a position where it will again stand ready to feed the bottle-racks; Fig. 21 a detail of a portion of the means employed for elevating the spindle-lifting plates; Fig. 22 a sectional view of one of the brushes employed upon the exterior of the bottles; Fig. 23 a transverse horizontal sectional view thereof; and Fig. 24 a detail of one of the rinsing or spraying spindles.

One object of my invention is to provide a simple and effective machine for washing bottles, the mechanism being capable of cleaning the bottles upon both their inner and outer faces and rinsing the interior of the bottles.

A further object is to provide an improved mechanism whereby the bottles need not be raised or lowered after having been placed within the machine, the washing and rinsing being effected by the use of a series of telescoping spindles which are raised and lowered toward and from the bottles.

Another object is to provide an apparatus wherein bottles of various lengths may be washed without necessitating any adjustment of the machine, the parts automatically adjusting themselves according to the length of the bottles placed within the racks.

Many advantages are incident to the construction of the machine herein shown, all of which will be hereinafter set forth.

Referring to the drawings, and more particularly to Figs. 1 to 3 inclusive, it will be seen that the frame of the machine is composed of two upright members, A and C, which are securely fastened to a base D, each member having a cross-bar or member E at the upper end thereof and a cross connecting bar F located in a plane slightly below the middle of the apparatus. The members A and C are connected to each other by angle-plates G, G' which are secured at the upper corners of said members. Braces H are secured between the members A and C in line with the cross connecting bars F, said braces H and angle-plates G, G' securely binding the parts together and serving to render the frame as a whole rigid. A supplemental frame I (Fig. 3) is secured to one side of the main frame of the machine at the midlength thereof, the lower end of frame I being rigidly bolted to an extension of the base D. This supplemental frame forms the support for the cam mechanism which operates the various parts, as will hereinafter appear in detail.

Secured to the members A and C are brackets J, Fig. 3, upon which are mounted tracks or ways K that extend throughout the length of the frame of the machine and beyond the same to a point where the bottle-racks L (which are supported thereon) may be readily placed in position and likewise received from the machine as they are automatically discharged. The racks L may be of any approved type and are herein shown as comprising an open framework adapted to receive and hold the bottles in an inverted position.

In order to present the racks to the machine and advance them automatically therethrough from the first set of spindles (which may be termed the washing spindles) to the second set of spindles (the rinsing spindles) and to automatically discharge them one at a time, the following mechanism is employed: Extending downwardly from the cross member E of the members A and C are brackets M (see Figs. 3, 17, 18 and 19) to which are attached two L-shaped anglebars N, which extend throughout the length of the machine and overlie the bottoms of the bottles, forming a stop against which the bottles are raised by the action of the mouth-pieces, to bring the bottoms of all the bottles to the same level, for the purpose of allowing the interior brushes to uniformly clean the interior faces of the bottoms of the bottles. The brackets M also form the support for a trough-shaped member or bar O, which may be moved endwise through said brackets as occasion demands. Bars P, P are placed above a trough-shaped bar or member O, and hooks Q (fulcrumed at R upon hinges S secured to the trough-shaped bar) are pivotally connected to said bars P, as will be best seen upon reference to Figs. 17 and 19. The depending ends of the hooks Q pass through openings T formed in the lower portion of the trough-shaped bar O and normally stand in the path of travel of the upper member of the crates. Attached or secured to the bars P is a rack U, which meshes with a sector gear V, mounted upon a shaft W. An oscillating motion is imparted to said shaft by mechanism which will be hereinafter described, and the bars P with the hooks Q and trough-shaped member O are moved back and forth through the brackets M. To the outer left-hand end of bars P is secured a rod or stem X, which passes through the upstanding end of a bracket Y, secured to the trough-shaped member O. The stem passes freely through the opening in the bracket and is provided at its outer end with a nut and washer which bear against and confines a coiled spring Z between the washer and the bracket, thereby tending normally to counterbalance the weight of the hooks Q and as a consequence allow them to be readily elevated and depressed by the longitudinal motion of the bars P, imparted by the rack U and sector V. In order to limit the movement of the bars P relatively to the trough-shaped member O, and consequently to limit the upward movement or elevation of the hooks, an adjustable stop pin A' is provided. Said pin bears against the end of one of the bars P and thereby serves to limit the movement and prevent the hooks from being elevated too great a distance.

In Fig. 17 the parts are shown in the positions which they occupy when the sector gear has rotated slightly and drawn the bars P forwardly a short distance, independent of any movement of the trough-shaped member O. This initial movement of the bars P throws the hooks down into the positions shown in said figure, and as a consequence when the sector is rotated farther the trough-shaped member O and bars P are moved forward together, and the depending ends of the hooks Q come into contact with the upper members of the bottle-racks and move the same forward the length of one rack. In said Fig. 17, a rack is shown as being discharged, and a new one about to be introduced, the rack working over the rinsing spindles being moved outwardly and that which overlies the washing spindles moved or advanced to a position over the rinsing spindles. Upon the return movement of the sector the bars P are carried to the left independently of the member O, until the hooks are raised and assume the positions shown in Fig. 20. A further movement will carry the trough-shaped member O along with bars P and the parts will then be in a position in which they can move the racks forward another step.

As above noted, it is designed to first submit the bottles to an internal and external washing and scrubbing through the action of rotary spindle brushes, and to then subject them to a rinsing action upon their interior faces only. This is accomplished by the employment of a series of vertically-disposed spindles through some of which water and air are forced. During the initial washing operation the spindles are passed into the interior of the bottles, and a series of spindle brushes work upon the outer faces thereof, water being forced through the interior spindles and supplied to the outer faces of the bottles and to the brushes which work between the same. In the final or rinsing operation, spindles are used upon the interior only of the bottles.

All the spindles in the construction shown are telescopic, being raised and lowered toward and from the bottles by mechanism which will hereinafter be described.

As will be seen more particularly upon reference to Fig. 4, the base of the machine is formed with three separate chambers B', C' and D', B' designating the compressed air chamber, C' the water chamber, and D' the oil chamber, in which the gears that serve to rotate the spindles are mounted. The base will preferably be built up in the manner shown in said figure, inasmuch as the parts may be readily formed and assembled when the construction therein shown is employed. The top of chamber D' is closed by a pan or receptacle E', which is designed to catch the water that runs down from the bottles.

The interior washing spindles which pass into the bottles are shown in detail in Figs. 7 to 11 inclusive, each spindle comprising an air tube or pipe F' which opens from the upper wall of the air chamber B' and extends upwardly through the water chamber C', and through the lower end of a tube H' which is secured in the upper cover-plate or wall of the water chamber C'. Said tube H' extends to a point near the bottom of the water chamber C' and projects upwardly through the oil chamber D' to a point slightly above the bottom of the pan E'. Both the members F' and H' are fixed and make a close joint with the parts to which they are secured, so that the water cannot pass into the air chamber around pipes F', nor into the oil chamber around the upper portions of the members H'. The bottom of pan E' is provided with a series of threaded openings, in which are secured elongated bearing blocks or hubs I', designed to form the bearings for the rotatable sleeves or members J'. The lower end of each of said members J' is provided with a gear, hereinafter described in detail, securely fastened thereto, while a ring or washer L' surrounds the sleeve J' and rests upon the upper end of a bearing-block or hub I', thus preventing vertical movement of said member J'. The upper end of each sleeve or member J' is provided with a bushing M', having a lug N' extending outwardly therefrom, said lug passing into a longitudinally-disposed slot or opening O' formed in the shell or guard P'. Said shell or guard is pin-jointed or otherwise secured to a sleeve or casting Q', having a laterally-projecting shoulder or flange R' adjacent to its lower end. A pipe S' is secured in the casting Q', and extends downwardly therefrom, passing through the bushing M' and into the tubular sleeve or member J'. Said pipe S' is provided with a shoulder or enlarged portion S⁴ which, when the spindles are elongated or the telescoping member raised, enters the lower portion of the bushing M' and forms a relatively tight joint as the spindles are raised. This construction prevents the escape of water from the spindle when the parts are being raised and are in their elevated positions, at which time only it is designed that the water shall be forced through the spindles by air-pressure. Securely mounted in the upper end of the pipe S' is a hollow spindle T', carrying at its upper end a spirally-disposed brush U', the spindle being perforated as shown at U⁶, Fig. 4 adjacent to the brush in order to permit the water forced therethrough by the air to pass out upon the brush or against the bottle in order to thoroughly cleanse the bottle. It is manifest that any desired form of brush or cleaning device may be used in conjunction with the spindles.

The spindles and brushes which act upon the outer faces of the bottles are best shown in Figs. 22 and 23. The lower portions of the spindles are the same as those first described in connection with the interior spindles, with the exception that the water tubes and air pipes are omitted. The upper end of each spindle carries a tube T⁴, provided with a flanged collar U⁴, said collar forming a seat for the lower reduced ends of the brush-sections V⁴, which surround the member T⁴. The upper end of said member T⁴ is threaded and a threaded collar U⁵, provided with a downwardly-extending flange is screwed upon the threaded end and fits over the reduced upper ends of the brush sections. The lower portion of the brush, formed by the sections V⁴, will preferably be provided with bristles of a length greater than those upon the upper portion of the brush. This will enable the brush to act upon the necks of the bottles. The sleeve or casting Q' of each of the spindles passes through a threaded bushing V', secured in a plate W', and a nut or threaded collar X' is mounted upon the upper end of the member Q', thus securing the outer movable telescoping portion of the spindle to the spindle-elevating plate W'. The connection, however, permits rotation of the spindle in the bushing V', and this rotary movement is imparted by the gear to the sleeve J', thence through the lug N' to the outer shell or guard P', and through it to the sleeve or casting Q', to the pipe S' and spindle T' carried thereby.

The manner in which the spindles are geared and driven is shown in detail in Figs. 4 and 5. A counter-shaft Y' is mounted at one end of the machine (see Figs. 3 and 5), said shaft carrying a pair of bevel gears A², B², which mesh with corresponding gears C², D², mounted upon the outer ends of a pair of horizontally-disposed shafts E², F² (see Figs. 4 and 5) extending through the oil chamber. Said shafts are each provided with three bevel gears G², H², I², said gears in turn meshing with bevel pinions J², K², L², mounted upon the lower end of the alternate spindles in the outer series of spindles which pass in between the bottles, or those which work upon the outer faces of the bottles. Rotary motion is thus imparted to said spindles and by the employment of gears M², mounted above the bevel gears J², K², L², rotary motion is imparted to the remaining spindles, through the agency of gears N², elongated gears O² and the relatively large gears P², carried by the alternate outer brush-spindles. Said gears P² lie in a plane above the gears M², N², as will be readily seen upon reference to Fig. 4, and the elongated gears O² form intermediate driving connections between the gears M² and the gears P².

In practice it is designed to have the chamber D' filled with oil, so that all the gears may run therein, thus reducing the amount of friction as much as possible and preventing the entrance of water to the gears and consequent corrosion of the parts.

With the gearing thus constructed the inner and outer spindles will be rotated in reverse directions, and each spindle carries a gear at its lower end, the gears differing in size and shape according to the positions of the spindles.

As before noted, the spindles carrying the brushes which act upon the outer faces of the bottles do not extend down into the water chamber (see Fig. 4) and in order to supply water to such brushes and to the outer faces of the bottles I employ perforated pipes V⁵, (as shown in Fig. 3), which spray the outer brushes and the bottles with water.

In order to properly position the spindles with reference to the bottles, the spindles are raised or extended in a manner hereinafter described. It is designed to provide a mouth-piece to place each bottle in position, and also a guide or funnel-shaped member to introduce or direct the spindle-end into the mouth of the bottle. To this end I provide a plate Q², hereinafter termed the "mouth-piece plate," which as will be seen upon reference to Fig. 6 is of lattice form, threaded openings being made at the points of crossing of each of the members which form the plate, and into which threaded openings are screwed the inverted funnel-shaped castings R². These castings stand in direct alinement with the spindles which are designed to pass into the mouths of the bottles, the other spindles passing through openings left in the plate Q² between the cross-bars thereof and between the bottles. The upper end of each casting or funnel-shaped member R², which extends slightly above the mouth-piece plate Q², is provided with an undercut groove or channel adjacent to the upper face of the plate Q², and a series of outwardly-bent fingers S² (preferably four in number) is arranged about said casting, the lower inturned ends of said fingers passing into the groove and being held in position by a rubber ring T² which is passed around the fingers at their lower ends, as is most clearly shown in Fig. 12. The bottles, of course, may vary in size, and the openings in the lower portion of the racks which support the bottles will also vary slightly, but must be sufficiently large to permit the bottle-neck to pass therethrough without difficulty.

As the plate Q² is raised, the outwardly-extending fingers S² (which as above noted are yieldingly mounted) serve to protect and guide each bottle-mouth, and to tilt the bottle so as to bring the opening therein into direct alinement with the opening in the upper end of the funnel-shaped casting R². This position is shown in Fig. 12. Casting R² likewise serves to deflect the bristles of the brush and to cause them to pass into the bottle-mouth without difficulty. Were it attempted to pass the spindle-brush directly into the mouth of the bottle without first bending down or deflecting the bristles, difficulty might arise and the bottle be thrown out of line with the spindle, thereby causing the spindle to be broken or the bottle to be injured by the spindle-end coming into contact with the edge of the bottle-mouth. The construction herein shown properly positions the bottle and permits the spindle-brush to pass into the bottle without difficulty. The yielding fingers likewise give sufficiently to prevent the bottles from being chipped or otherwise injured, and at the same time grip the bottle-mouth and press the bottle upwardly against the angle-bar N, thereby preventing rotation of the bottle.

The mouth-piece plate Q² is normally drawn up toward the mouths of the bottles through the action of coiled springs U², the lower ends of which are secured to outwardly-projecting arms or lugs V², carried by the mouth-piece plate Q² (see Figs. 3 and 6), while the upper ends of the springs are secured to arms W², extending outwardly from the members G, G'.

In order to protect the springs from water, which might fall thereon during the operation of the spindles, I provide a telescoping casing composed of two parts X², Y², which permit the springs to expand and contract, while affording a cover therefor at all times.

Extending downwardly from the plate Q² are rods Z², passing through elongated hubs A³ formed upon the spindle-raising and lowering plate W'. The lower ends of the rods Z² are provided with nuts B³ which bear against the lower ends of the hubs. Thus, as plate W' is lowered it comes into contact with the nuts B³ on the rods Z² and draws the mouth-piece plate down and elongates the springs U². Immediately the plate W' begins to move up with the spindles, the springs U² raise the mouth-piece plate and carry the mouth-pieces into direct contact with the mouths of the bottles, raising them to a uniform level against the overlying angle-bar N, the difference in length of the bottles being taken up in the mouth-pieces. Plate W' continues its upward movement after the mouth-pieces come into contact with the bottles, independent of any further movement of the mouth-piece plate Q², and the hubs A³ slide upon the rods Z², as indicated in Fig. 2.

By the use of this construction bottles of different lengths, such as quarts and pints, may be treated in the same machine without any particular adjustment of the parts, said parts being in effect self-adjustable. It is customary, however, to place bottles of one size in each rack, as, for instance, all pints or all quarts. A series of short bottles is shown in the two racks to the left in Fig. 17, while longer bottles are shown in the rack to the right in said figure. Bottles of different lengths are likewise shown in Fig. 2, wherein the relation of the mouth-piece plate to the rest of the apparatus is clearly illustrated. In other words, the mouth-piece plate will adapt itself to various lengths of bottles, while the spindles have a rapid up-and-down motion independent of any particular range of movement of the mouth-piece plate.

In order to effect the raising and lowering of the spindle-carrying plates W', the following mechanism is employed, particular reference being had to Figs. 1, 2, 3, 4, 13, 14, 15, 16 and 21: Each of the spindle-carrying plates is mounted upon a frame composed of two angle plates C³ extending lengthwise of the machine and connected at their ends by cross bars or yokes D³, see Fig. 6. Each yoke is provided at each end with a vertically-disposed opening through which are passed rods E³, said rods being provided with collars F³ immediately below the yoke, and by which the yoke and attached parts are lifted when the rods are elevated. Said rods E³ pass through suitable guides G³ secured to the frame so as to insure a true vertical movement thereof. In order to effect the raising and lowering of the rods and consequently the raising and lowering of the spindle-frames, I attach to each rod (by means of a block H³ pinned to the rod) an adjustable link or pitman I³. The upper end of each pitman is connected to an arm J³, mounted upon and extending outwardly from shafts K³ secured upon the upper portion of the framework. Each shaft K³ (of which there are two) is provided with an inwardly-projecting crank-arm L³, which in turn is connected to a cross-bar M³ by links N³. Said cross-bar is adjustably secured to an upwardly-extending arm or post O³ which in turn is connected to a yoke P³ forming the upper member of a frame, the other members of which are yoke Q³ and connecting bars R³ and S³. The lowermost yoke Q³ has attached to it a downwardly-extending rod T³, which forms the support for a weight U³. The upper member or yoke P³ is provided with a roller V³ and the lower yoke Q³ has a similar roller W³. A cam X³, of the form best shown in Fig. 16, works within the frame and is securely mounted upon a shaft Y³, to which motion is imparted through a worm gear Z³ and a worm A⁴. Said worm is mounted upon a shaft B⁴, said shaft likewise carrying a driving pulley C⁴, and a sprocket-wheel D⁴ about which passes a sprocket-chain E⁴, said chain likewise passing about a sprocket-wheel D⁵ mounted upon shaft Y'. Cam X³ carries a roller F⁴ which stands in line with the yokes, the effective body or working portion of the cam standing out of line with the yokes but in line with the rollers V³ and W³, as best shown in Fig. 15. As shaft Y³ is rotated, roller F⁴ first comes into contact with yoke P³, and as the roller passes out of contact with the ends of the yoke the working face of the cam comes into contact with the roller V³, so that the cam and yoke are in rolling contact with each other at all times.

A frame, comprising an upper yoke G⁴, a lower yoke H⁴, and connecting bars I⁴, J⁴, is arranged adjacent to the frame just referred to (see Fig. 13) and a cam K⁴ mounted upon shaft Y³ works in conjunction with this frame. The cam and frame are provided with antifriction rolls, as above described. Extending upwardly from the yoke G⁴ is a rod L⁴, passing through a guide M⁴ projecting outwardly from the yoke and carrying at its upper end a rack N⁴ which meshes within a pinion O⁴ mounted on the shaft W to which the sector gear V is secured. A guide rod P⁴ is carried by the lower yoke H⁴, said rod extending through a fixed portion of the frame and preventing lateral displacement of the frame of which the yoke forms a part, when it is being acted on by the cam.

The cams X³ and K⁴ are so timed that when one of the cam frames is elevated it is held in that position for a quarter of a revolution of the shaft Y³, while the other cam is elevating the second frame, and the same action is effected as the frames are lowered. This causes the racks to be advanced while the spindles and mouth-piece plate are in their lowest positions, the racks being advanced the full amount or from one set of spindles to the other. At the moment the crank-advancing mechanism reaches its limit of forward movement the spindles are elevated.

Inasmuch as the second series of spindles are not designed to be rotated in the form of apparatus shown herein, the outer guard P' has been omitted and the spindles are accordingly telescopic, the upper members of which are attached to and carried by the spindle-frame. It is conceivable, of course, that they might be constructed exactly as the washing spindles and the same gearing employed to impart rotary motion thereto.

In Fig. 24 I have shown a detail of a nozzle for the upper ends of the spraying or washing spindles. The upper end of the tube is provided with a conical seat $a$, and a plug having an inverted frusto-conical face $b$, with a stem $c$ extending downwardly therefrom, is mounted in the upper end of the tube. The stem is slotted and a through-pin $d$ holds the plug in place, allowing it to move upwardly to a limited extent under the pressure of the water and air.

The operation of the apparatus is as follows: Assuming that a number of racks have been introduced into the machine, as shown in the drawings, and further that the cams are in the positions shown in Fig. 13, the sector gear V will be rotated and cause an advance movement of the bars P and trough-shaped member O, the first movement of bars P drawing hooks Q down into the positions shown in Fig. 17, where they will engage the racks and move the same forwardly. After they have been moved the required distance the rods $E^3$ are elevated. The upward movement of these rods carries the frames which support the plates W' or spindle plates upwardly. At the same time, springs $U^2$ which were elongated or under tension will draw the mouth-piece plates $Q^2$ upwardly until the mouth-pieces come into contact with the bottles, raising them against the overlying angle-bars N. Said plates $Q^2$ will then come to rest, and the spindle-carrying plates W' will continue their upward movement, the rods $Z^2$ passing through the hubs $A^3$. The parts will then occupy the positions shown in Fig. 2, certain of the spindles having passed up into the bottles while the remainder will occupy the spaces between the bottles and act upon the outer surfaces thereof. The spindles will remain elevated during one quarter revolution of the shaft $Y^2$, the inside revolving spindles thoroughly scrubbing the inner faces of the bottoms of the bottles. During this period the rack-advancing mechanism is moved rearwardly. The spindles also remain in an elevated position until the cam $X^2$ begins to move the post $O^3$ upwardly and through the connections above described cause a downward movement of the rods $E^3$, which will have the effect of again lowering the spindle-carrying plates.

The mouth-pieces remain in contact with the bottles until the lower ends of the hubs $A^3$ again come into contact with the nuts $B^3$ mounted upon or carried by the lower ends of the rods $Z^2$, when the continued downward movement of plates W' will draw the mouth-piece plates $Q^2$ downwardly away from the bottle-mouths, placing the springs $U^2$ under tension. The rack-advancing mechanism then comes into action and the operation above outlined is repeated.

It is to be noted that with a machine constructed in accordance with the present invention it is not necessary that the bottle-racks be raised or lowered, but only the comparatively light spindles need be elevated.

By the employment of the combined air and water chambers much more effective results are obtained than if water alone be forced through the spindles. The combined air pipe and water tube may be said to form an injector, and by actual use and tests it has been demonstrated that the water is forced through the spindles in a much more effective manner than if water-pressure alone were relied upon. The water is atomized to a certain extent, the air tending at all times to force the water out of the bottles, which are thus prevented from becoming filled (as is the case when water alone is used) and destroying in a measure the effectiveness of the work of the brushes and enabling the bottles to be thoroughly cleansed.

It is apparent that the machine herein shown and described may be employed in conjunction with a bottle-soaking or like machine, such for instance as that shown in my Patent No. 792,010, dated June 13th, 1905, the application for which was copending herewith. When this is done, it is only necessary to extend the tray-supports or tracks from one machine to the other, and to make the rack-advancing mechanism co-extensive therewith. Both machines may be driven from a common source.

No claim is made herein to the combination, generically stated, of means for holding a series of bottles, a series of spindles arranged to enter the bottles, a second series of spindles adapted to pass between the bottles and to act upon the outer surfaces thereof, means for moving the spindles into and out of operative relation with the bottles, and means for rotating the spindles, said combination forming the subject-matter of claims embodied in my Patent No. 947,151, dated January 18, 1910.

Having thus described my invention, what I claim is:

1. In a machine for washing bottles, the combination of means for holding a series of bottles; a mouth-piece plate movable toward and from the bottles; mouth-pieces carried by said plate; means for moving the plate and thereby bringing the mouth-pieces into contact with the bottles; a series of spindles arranged in line with the mouth-pieces; and means for moving the spindles into and out of the bottles.

2. In a machine for washing bottles, the combination of means for holding a series of bottles; a mouth-piece plate; a series of mouth-pieces carried thereby; means for moving the plate and thereby bringing the mouth-pieces into contact with the mouths of the bottles; a series of spindles; means for moving the spindles into and out of the bottles; means for rotating the spindles; and means for forcing water through the spindles.

3. In a machine for washing bottles, the combination of means for holding a series of bottles; a mouth-piece plate; a series of mouth-pieces carried thereby; means for normally elevating said mouth-pieces and drawing them into contact with the mouths of the bottles; a series of spindles arranged in line with the mouth-pieces; means for reciprocating the spindles and causing them to pass into and out of the bottles; and connections intermediate said means and the mouth-piece plate for drawing said plate out of contact with the bottles as the spindles are withdrawn.

4. In a machine for washing bottles, the combination of means for holding a series of bottles; a mouth-piece plate; a series of mouth-pieces carried thereby; springs serving normally to draw the mouth-pieces into contact with the mouths of the bottles; a series of spindles; means for moving said spindles endwise into and out of the bottles; and connections intermediate said means and the mouth-piece plate for withdrawing the mouth-pieces from contact with the bottles as the spindles are fully withdrawn.

5. In a machine for washing bottles, the combination of a suitable track or way adapted and arranged to support a bottle-holding rack; means to periodically advance the rack along said way; a mouth-piece plate; a series of mouth-pieces carried thereby; means serving normally to draw the mouth-pieces into contact with the mouths of the bottles and to thereby properly position and hold the same; a series of spindles; means for moving said spindles endwise into and out of operative relation with the bottles; and connections intermediate said means and the mouth-piece plate for withdrawing said plate and thereby the mouth-pieces from contact with the bottles as the spindles are moved out of operative relation with the bottles.

6. In a machine for washing bottles, the combination of a suitable frame; a track or way carried thereby and adapted and arranged to support a bottle-holding rack; means for periodically advancing the rack along the way; a mouth-piece plate; a series of mouth-pieces carried thereby; means serving normally to draw the mouth-pieces into contact with the mouths of the bottles; a series of spindles; means for raising and lowering said spindles into and out of operative relation with the bottles; means for rotating said spindles; and connections intermediate said means and the mouth-piece plate for withdrawing the mouth-pieces from the bottles as the spindles are brought out of operative relation with the bottles.

7. In a machine for washing bottles, the combination of a suitable frame; a track or way carried thereby and adapted and arranged to support a bottle-holding rack; means for periodically advancing said rack; a series of spindles; means for moving said spindles endwise into and out of operative relation with the bottles while the rack-advancing means is at rest; a mouth-piece plate; mouth-pieces carried thereby; means for normally moving said plate into operative relation with the bottles carried by the rack; and connections intermediate said mouth-piece plate and the means for operating the spindles for drawing the mouth-pieces out of contact with the bottle mouths as the spindles are carried out of operative relation with the bottles prior to the forward movement of the rack through the machine by the operation of the advancing means, substantially as described.

8. In a machine for washing bottles, the combination of a suitable frame; a track or way carried thereby and adapted and arranged to support a series of bottle-holding racks; a series of washing spindles; a series of rinsing spindles; means for raising and lowering said spindles into and out of operative relation with the bottles carried by the racks; and means for advancing the racks along the track or way from one set of spindles to the other, said means coming into operation while the spindles are lowered, substantially as described.

9. In a machine for washing bottles, the combination of a suitable frame; a track or way carried thereby and adapted and arranged to support a series of bottle-holding racks; a series of washing spindles; a series of rinsing spindles; means for periodically raising and lowering said spindles; a mouth-piece plate; a series of mouth-pieces carried thereby; means for normally drawing said mouth-pieces into contact with the mouths of the bottles; connections intermediate said mouth-piece plate and the means for raising and lowering the spindles, and serving to withdraw the mouth-pieces from contact with the bottles when the spindles are lowered; and means for advancing the racks along the track or way when the spindles are in their lowered position.

10. In a machine for washing bottles, the combination of a suitable frame; a track or way carried thereby and adapted to support a series of bottle-holding racks; a series of telescoping spindles; means for supplying water to said spindles; and means for raising and lowering the upper telescoping portions of the spindles to carry them into and out of operative relation with the bottles.

11. In a machine for washing bottles, the combination of a suitable frame; a track or way carried thereby and adapted and arranged to support a bottle-holding rack; a series of telescoping spindles; means for supplying water to said spindles; means for raising and lowering the upper telescoping portions of the spindles to carry them into and out of operative relation with the bottles; a mouth-piece plate; a series of mouth-pieces carried thereby; means for normally moving said plate toward the bottles; and connections intermediate said plate and the spindle-moving means for moving said plate and drawing the mouth-pieces out of contact with the bottles as the spindles are lowered, substantially as described.

12. In a machine for washing bottles, the combination of a suitable frame; a track or way carried thereby and adapted and arranged to support a bottle-holding rack; a series of telescoping spindles; means for forcing water through said spindles; means for rotating the spindles; means for raising and lowering the upper telescoping portions of the spindles to carry them into and out of operative relation with the bottles; a mouth-piece plate; a series of mouth-pieces carried thereby; means for normally drawing the mouth-pieces into contact with the bottles; and connections intermediate said mouth-piece plate and the means for raising and lowering the spindles, said connections serving to withdraw the mouth-pieces from the bottles as the spindles are lowered.

13. In a machine for washing bottles, the combination of a suitable frame; a track or way mounted thereon and adapted and arranged to support a bottle-holding rack; a mouth-piece plate; a series of mouth-pieces carried thereby; and yielding means for drawing said plate and mouth-pieces into contact with the bottles, whereby the plate and mouth-pieces may adapt themselves to bottles of different lengths, substantially as described.

14. In a machine for washing bottles, the combination of a suitable frame; a track or way carried thereby and adapted and arranged to support a bottle-holding rack; a mouth-piece plate; a series of mouth-pieces carried thereby; means for yieldingly moving said plate toward the bottles; means for withdrawing said mouth-piece plate from the bottles; and means for advancing the rack along the way when said mouth-pieces are withdrawn.

15. In a machine for washing bottles, the combination of a suitable frame; a track or way mounted thereon and adapted and arranged to support a bottle-holding rack; a mouth-piece plate; a series of mouth-pieces carried thereby; springs connected to said mouth-piece plate and to a fixed portion of the frame and normally tending to draw said plate upwardly into contact with the bottle mouths; a series of telescoping spindles; means for forcing water through said spindles; a plate connected to the upper telescoping portions of said spindles; means for raising and lowering said plate; and connections intermediate said plate and the mouth-piece plate and adapted and arranged to move said plate downwardly when the spindles are lowered to their greatest extent.

16. In a machine for washing bottles, the combination of a suitable frame; a track or way mounted thereon and adapted and arranged to support a bottle-holding rack; a mouth-piece plate; a series of mouth-pieces carried thereby; springs connected to said mouth-piece plate and to a fixed portion of the frame and normally tending to draw said plate upwardly into contact with the bottle-mouths; a series of telescoping spindles; means for forcing water through said spindles; a plate connected to the upper telescoping portions of said spindles; means for raising and lowering said plate; connections intermediate said plate and the mouth-piece plate and adapted and arranged to move said plate downwardly when the spindles are lowered to their greatest extent; and means for rotating the spindles.

17. In a machine for washing bottles, the combination of a suitable frame; a track or way carried thereby and adapted and arranged to support a series of bottle-holding racks; and means for advancing the racks along said way, said means comprising two longitudinally-movable members, hooks pivotally connected to said members whereby the members may be moved longitudinally relatively to each other, and means for imparting motion to one of said members, whereby one member will be moved to a slight extent independent of the other, and both members will then move forward together.

18. In a machine for washing bottles, the combination of a suitable frame; a track or way carried thereby and adapted to support a series of bottle-holding racks; and means for advancing the racks, said means comprising a series of hooks, and means for supporting said hooks to cause them to project downwardly into the path of travel of the racks as the parts are moved forwardly in one direction and to be withdrawn out of the path of travel of the racks as the advancing means is moved in the opposite direction.

19. In a machine for washing bottles, the combination of a suitable frame; a track or way adapted and arranged to support a series of bottle-holding racks; a supporting member overlying the bottle-racks; means for supporting said member; a series of hooks pivotally connected to said member; a member pivotally connected to the upwardly-extending ends of the hooks; a spring tending normally to move said member endwise and to rock the hooks upon their fulcrums or pivotal connections on the supporting member to thereby elevate their downwardly-projecting ends; and means for applying power to the member connected to the upper ends of the hooks, whereby said member will be moved independently of the lower supporting member to a slight extent in order to raise or lower the hooks according to the direction of movement and to then advance the mechanism as a whole.

20. In a machine for washing bottles, the combination of a suitable frame; a track or way carried thereby and adapted and arranged to support a series of bottle-holding racks; and means to advance said racks along the way, said means comprising a trough-shaped member carried by suitable brackets secured to the frame; a series of hooks pivotally secured to said trough-shaped member the lower ends of the hooks extending downwardly through openings formed in the bottom of the trough-shaped member, a pair of bars pivotally secured to the upwardly-extending ends of the hooks, a bracket projecting upwardly from the trough-shaped member, a rod extending outwardly from the bars and passing freely through said bracket, a spring surrounding the rod and serving normally to draw the same in a rearward direction, a rack secured to the bars, means for imparting a reciprocating motion to said rack and through it to the other members, and a stop to limit the endwise movement of the bars.

21. In a machine for washing bottles, the combination of a suitable frame; a track or way carried thereby and adapted and arranged to support a series of bottle-holding racks; a series of telescoping spindles; means for raising and lowering the upper portions of said spindles; a series of gears carried by the lower ends of the spindles; and means for imparting motion to said spindles.

22. In a machine for washing bottles, the combination of a suitable frame; a track or way carried thereby and adapted and arranged to support a bottle-holding rack; an oil chamber formed in the lower portion of the frame; a series of telescoping spindles mounted upon said chamber; a series of gears carried by the lower end of the spindles; means meshing with said gears for causing the rotation thereof and rotation of the spindles; and means for raising and lowering the telescoping portions of the spindles.

23. In a machine for washing bottles, the combination of a suitable frame; a track or way carried thereby and adapted and arranged to support a bottle-holding rack; a base for the frame in which is formed an air chamber, a water chamber, and an oil chamber; a series of telescoping spindles mounted upon the base, each spindle having a fixed tube which extends into the water chamber, a tube extending from the air chamber into the tube in the water chamber, and a driving sleeve J' mounted intermediate the telescoping portion of the spindle and the fixed tube which extends from the water chamber; a gear carried by each of said driving sleeves, said gear being located within the oil chamber; and suitable gearing likewise mounted in the oil chamber for imparting motion to the gears carried by the sleeves, substantially as described.

24. In a machine for washing bottles, the combination of a suitable frame; a track or way carried thereby and adapted to hold a bottle-rack; a mouth-piece plate movable toward and from the bottles carried by said rack; a series of mouth-pieces carried by the plate, each mouth-piece comprising an inverted funnel-shaped member having a groove formed around its upwardly-projecting end, a series of outwardly-extending fingers, the lower ends of which are seated in the groove, and an elastic member surrounding the lower ends of the fingers adjacent to the upwardly-projecting portion of the funnel-shaped member; a series of spindles; and means for raising and lowering said spindles into and out of operative relation with the bottles carried by the rack.

25. In a machine for washing bottles, the combination of a suitable frame; a track or way carried thereby and adapted and arranged to support a series of bottle-holding racks; a series of telescoping spindles; a plate connected to the upper telescoping portions of said spindles; a frame for supporting the plate; guide rods to which said frame is attached; a power shaft; a pair of cams carried thereby; a frame working in line with each of said cams, the cams being so set as to move the frames in opposition to each other; connections intermediate one of said frames and the guide rods; means for advancing the racks along the way; and connections intermediate the second cam frame and said means.

26. In a machine for washing bottles, the combination of a main frame; a power shaft carried thereby; a worm mounted upon the shaft; a worm gear meshing therewith; a shaft driven by the worm gear; a pair of cams mounted upon said shaft; a frame working in line with each of said cams, the cams being so set as to move the frames in opposition to each other; a track carried by the main frame and adapted and arranged to support a series of bottle-holding racks; means for moving said racks; connections intermediate one of the cam frames and said means for imparting a reciprocatory movement to the means; a series of telescoping spindles; a plate connected to the telescoping portions of the spindles; and connections intermediate said plate and the second cam frame for raising and lowering the plate, substantially as described.

27. In a machine for washing bottles, the combination of a suitable base provided with a water chamber and an air chamber; a hollow spindle opening into the water chamber; and a tube extending from the air chamber into the lower end of the spindle, said tube serving to direct air under pressure into the spindle, substantially as and for the purpose described.

28. In a machine for washing bottles, the combination of a water chamber; a hollow spindle opening into the same; and means for injecting air into the end of the spindle within the water, whereby water will be drawn into the spindle and ejected therefrom, substantially as described.

29. In a machine for washing bottles, the combination of a spindle; a water supply for the spindle; and a compressed air supply for the spindle, whereby the water will be ejected from the spindle in the form of a spray.

30. In a machine for washing bottles, the combination of a hollow chamber; a hollow spindle opening into the same; means for supplying water under pressure to the chamber; and means for injecting air into the water, whereby the water will be forced from the spindle, sprayed upon the interior of the bottle, and forced from the same.

31. In a machine of the character described, a bottle-supporting mechanism; and means whereby water and compressed air are applied to the bottles to wash and rinse the same.

In testimony whereof I have signed my name to this specification in the presence of two subscribing witnesses.

OTTO EICK.

Witnesses:
HOWARD E. CRUSE,
HARRY R. UHLLER.